United States Patent [19]

Turillon et al.

[11] 4,133,426
[45] Jan. 9, 1979

[54] HYDRIDE CONTAINER

[75] Inventors: Pierre P. Turillon, Ramsey; Gary D. Sandrock, Ringwood, both of N.J.

[73] Assignee: The International Nickel Company, Inc., New York, N.Y.

[21] Appl. No.: 880,959

[22] Filed: Feb. 24, 1978

[51] Int. Cl.² .................... B65D 25/00; F17C 11/00; C01B 1/26; F16L 55/04
[52] U.S. Cl. .......................... 206/0.7; 34/15; 55/523; 62/48; 220/3; 220/88 R; 423/248; 423/648 R
[58] Field of Search ................ 206/0.7; 220/88 R, 3; 423/248, 648; 55/523; 34/15; 62/48; 138/26, 28

[56] References Cited

U.S. PATENT DOCUMENTS

| 78,564 | 6/1868 | Austin | 138/28 |
|---|---|---|---|
| 933,152 | 9/1909 | Avery | 206/0.7 |
| 2,042,635 | 6/1936 | Sohellens | 55/523 |
| 3,315,479 | 4/1967 | Wiswall, Jr. et al. | 34/15 |
| 3,375,676 | 4/1968 | Reilly, Jr. et al. | 34/15 |
| 3,508,414 | 4/1970 | Wiswall, Jr. et al. | 62/48 |
| 3,516,263 | 6/1970 | Wiswall, Jr. et al. | 62/48 |
| 3,690,500 | 9/1972 | Remane | 220/3 |
| 3,822,807 | 7/1974 | MacDonald et al. | 220/88 R |
| 3,922,872 | 12/1975 | Reilly et al. | 423/248 |
| 3,931,395 | 1/1976 | Beckert et al. | 423/648 |

*Primary Examiner*—William T. Dixson, Jr.
*Attorney, Agent, or Firm*—E. C. MacQueen; F. J. Mulligan, Jr.

[57] ABSTRACT

A hydrogen-storage vessel having particles of hydrideable alloy in a multiplicity of closed containers permeable to hydrogen within the vessel to prevent localized pressure effects acting against the walls of the vessel.

5 Claims, 5 Drawing Figures

HYDRIDE CONTAINER

BACKGROUND OF THE INVENTION

Hydrogen is stored conventionally as a gas in steel cylinders at high pressures (e.g., 2,000 psi) and at lower pressures as a liquid in insulated containers. Both methods of storage require comparatively bulky storage containers. In addition to their unwiedly size, such containers are inconvenient due to the high pressure required for gas storage in cylinders and the ever present danger of gaseous hydrogen evolving from boiling-off of the liquid form.

Within recent years, considerable attention has been focused on the storage of hydrogen as a metallic compound, or hydride, of various substances. Metal hydrides can store large amounts of hydrogen at low and even sub-atmospheric pressures in relatively small volumes. This low pressure storage of hydrogen is relatively safe and allows the construction of hydrogen containers having forms significantly different than those presently known.

Hydridable metals are charged with hydrogen by introducing pressurized gaseous hydrogen into valved containers. The hydrogen gas reacts exothermically with the metal to form a compound. Discharging of the metal hydride is accomplished by opening the valve of the container, to permit decomposition of the metal hydride, an endothermic reaction. It has been found expedient when gas is desired from the storage vessel to heat the storage vessel thereby increasing the flow of hydrogen or providing hydrogen at pressures substantially above atmospheric.

During the adsorption/desorption process, the hydridable metal has been found to expand and contract as much as 25% in volume as a result of hydrogen introduction and release from the metal lattice. Such dimensional change leads to fracture of the metal powder particles into finer particles. After several such cycles, the powder self-compacts causing inefficient hydrogen transfer. Additionally, and of even greater significance, high stresses due to the compaction of the powder and expansion during hydride formation are directed against the walls of the storage container. The stress within the powder has been observed to accumulate until the yield strength of the container is exceeded whereupon the container buckles or bulges and eventually ruptures. Such rupture is extremely dangerous since a fine, often pyrophoric powder is violently expelled by a pressurized, flammable hydrogen gas. Small, experimental cylinders of the aforedescribed type have indeed been found to burst when subjected to repetitive charging/discharging conditions.

The problem of expansion and compaction has been recognized in the art to the extent that containers are only partially filled with hydridable metal powders. The problem of hydridable metal powder particle breakdown has been addressed in U.S. Pat. No. 4,036,944 wherein a thermoplastic elastomer binder is used to form pellets of the hydridable metal particles. Although this provides a solution to a portion of the problem of hydrogen storage, polymers are notoriously poor heat conductors, are subjected to thermal deterioration, and can react with hydrogen. Since heat is generated during hydrogen charging and since heat may, in many cases, be added during discharging, such polymer containing pellets appear to be only partially useful under somewhat restrictive operational conditions.

SUMMARY OF THE INVENTION

It has now been discovered that hydrogen can be more safely and more efficiently stored in a valved vessel containing hydridable metal powder housed in a plurality of metal sheathed storage capsules. The hydrogen storage unit comprises a sealed vessel, a valve means for introducing and withdrawing gaseous hydrogen from the vessel, and a plurality of hydrogen storage capsules containers within the vessel. The containers have a wall structure enclosing a definite volume which is deformable at pressures below the rupture pressure of the vessel and which comprises, at least in part, areas permeable to hydrogen and impermeable to solid particles. Because the individual capsules or containers are comparatively free to shift within the sealed pressure vessel, deformation of individual capsules that may occur due to absorption and desorption of hydrogen will be accommodated by relative motion of the capsules rather than be transmitted to the walls of the vessel. The voids between the capsules provide passageways for hydrogen flow between the capsules and the valve of the vessel.

DESCRIPTION OF THE PREFERRED EMBODIMENTS

Figure 1:
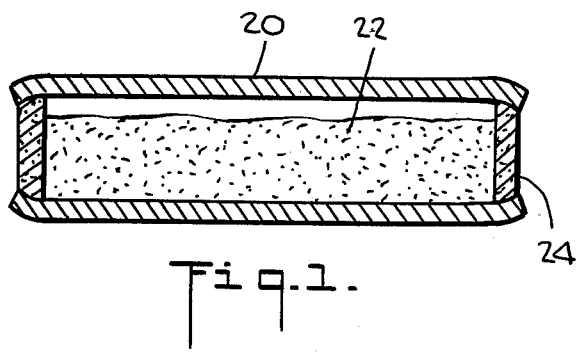
FIG. 1 represents a schematic cross-sectional view of a preferred embodiment of a cylindrical hydrogen storage capsule having open ends.

Referring now to FIG. 1, a cross-sectional view is shown of a preferred hydrogen storage capsule. The hydrogen storage capsule uses a container means 20 as a primary structural member. The container means can be a piece of tubing. Preferably, a metal tube is used to provide desirable heat transfer characteristics, thermal stability, strength and rigidity. It is preferred to use metals such as aluminum and copper for the container means. Other, less expensive metals, such as steel can also be used and are considered within the scope of the present invention. The tube shown in FIG. 1 is open at both ends prior to filling with powder. A hydridable metal powder 22 is retained within the container means by gas communicating means 24 at both ends of the tube which also serve to transmit hydrogen gas into as well as out of the container means. The gas communicating means can be prepared from a porous metal filter or any other hydrogen permeable but, powder impermeable substance that affords sufficient thermal stability and inertness. Materials such as porous polymers, metal wools, felts, etc., can be used. The gas communicating means shown in FIG. 1 is held in place by crimping the ends of the tubing. Other methods for affixing the gas communicating means include press-fitting, welding, brazing, soldering and adhesive bonding. The method of attachment should firmly affix the gas communicating means and provide sufficient thermal stability. A pore size of less than about 5 microns is preferred for the gas communicating means so that hydrogen gas can be readily conducted through the gas communicating means while powder particles are retained within the capsule.

It is preferred that the container means have a cylindrical form to provide a rigid structure resistant to internal stress resulting from expansion of the hydridable metal contained therein. In addition, such a rigid structure is resistant to pressure as well as the expansion load transmitted from surrounding capsules within a storage unit.

Figure 2:
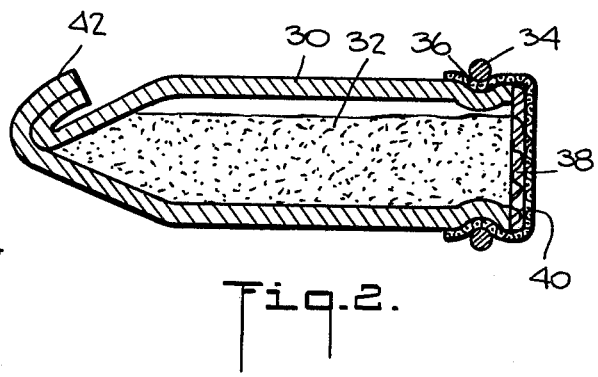
FIG. 2 represents a schematic cross-sectional view of a preferred embodiment of a hydrogen storage capsule having a crimped end.

FIG. 2 represents a second preferred embodiment of the hydrogen storage capsule. The capsule has a container means 30 preferably prepared from a metal tube to provide sufficient heat conductivity strength and rigidity. The hydridable metal powder 32 is maintained within the container means by the use of a combination of clamp 34 retained in grooves 36 and gas communicating means 38. Gas communicating means 38 is depicted as an inert fabric or felt material. Gas communicating means 36 can be strengthened by a back-up screen 40. A crimped end 42 can be used at the opposite end of the container to retain, in part, the hydridable metal powder within the container means.

Figure 3:
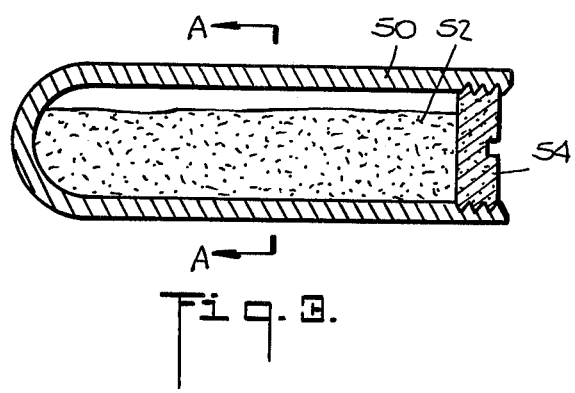
FIG. 3 represents a schematic cross-sectional view of a preferred embodiment of a hydrogen storage capsule having a threaded closure.

FIG. 3 represents a third preferred embodiment of the hydrogen storage capsule. It consists of a bullet-shaped container 50 generally cylindrical in configuration but having concave flutes 51 in the container walls. Hydridable metal powder 52 is retained within the container by threaded porous plug 54. The plug can be prepared from a porous metal or porous heat resistant polymer or any other inert, heat-resistant material that will retain the hydridable metal powder within the container yet allow ready passage of hydrogen gas into and out of the container means. Flutes 51 aid in providing hydrogen passages in the overall containing pressure vessel.

Figure 4:
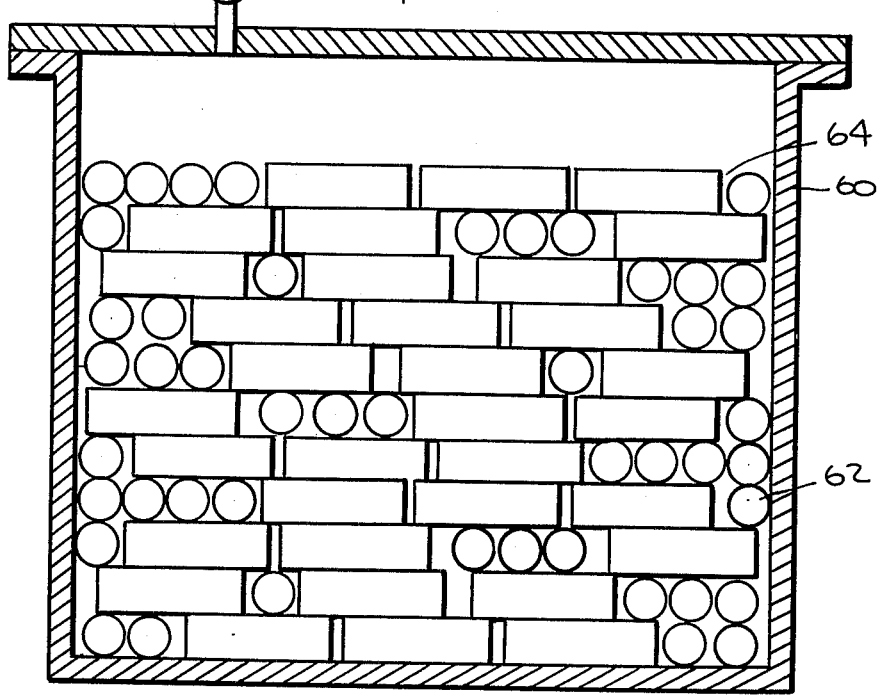
FIG. 4 represents a schematic cross-sectional view of a hydrogen storage unit containing a plurality of hydrogen storage capsules.

FIG. 4 represents a cross-sectional view of a hydrogen storage unit. A sealed vessel 60 is used to hold a plurality of hydrogen storage capsules 62. Gas passageways 64 are provided by the spaces between the storage capsules so that minimal stress is applied to the walls of the vessel. A valve means 66 is provided to allow entry and exit of hydrogen gas to the sealed vessel.

EXAMPLE

Figure 3A:
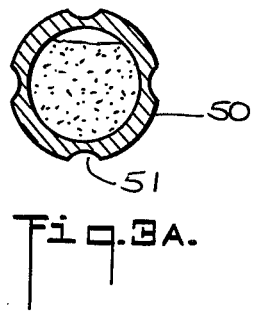
FIG. 3A is a cross-sectional view of the embodiment of FIG. 3 at plan A—A.

Aluminum containers generally of the configuration of those of FIG. 1 but having concave flutes as depicted in FIG. 3A each 76.2 mm long 12.2 mm in O.D. and having an internal volume of 9cc were constructed and filled, to achieve 40% voids in the hydride form, with particles of a mischmetal/calcium/nickel alloy. In comparative tests, four of these filled containers containing 137g of the alloy were used in a tubular hydrogen storage vessel close-fitting to the containers as opposed to the same amount of alloy being used in the same vessel but without any interior containment. In both instances vibration was applied to the pressure vessel to assure initial mal-distribution and subsequent packing and swelling of the hydridable metal. After two cycles of hydrogen charge discharge, the vessel with no internal containment was visibly and dangerously bulged. The vessel having internal containment was unchanged in dimension after four hydrogen-charge-discharge cycles and gave all evidence of being capable of being used indefinitely.

Those skilled in the art will appreciate that the foregoing example is one which was performed for test purposes only and that in ordinary practice a hydrogen storage vessel will have upwards of 20 individual containers therein. Such containers, when in cylindrical form, will advantageously have a diameter to length ratio of a least 0.16.

While the present invention has been described with respect to hydrogen storage, it will be appreciated that the invention is not limited to storage usage but is applicable for whatever purpose metal hydrides are formed and decomposed within a containing vessel. In addition, the invention is not limited to hydrogen but is applicable to any gas which reacts reversibly with any solid to form products with volume changes. For example, the invention is applicable to processes involving the formation of ammines using metal halides as the material reacting with ammonia. Specifically with regard to hydride formation, those skilled in the art will appreciate that metals and metallic compounds such as $CaNi_5$, $LaNi_5$, $SmCo_5$, $FeTi$, $Mg_2Ni$, $V$, $Mg$ etc., can be used as hydride formers.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A gas-containing means comprising
   (a) pressure resistant vessel having a valved port,
   (b) a plurality of closed containers positioned within said vessel, each container having
      (1) a wall structure enclosing a definite volume but deformable at pressures below the rupture pressure of said pressure resistant vessel at least part of said wall structure being permeable to said gas and impermeable to solid particles;
      (2) a multiplicity of solid, gas absorbing particles within said wall structure occupying, when in the gas-free state, substantially less than the total volume of said container, and, when in the gas-charged state, no greater than the total volume of the container; and
   (c) a continuity of gas passages between and among said containers communicating with said valved port.
2. A gas-containing means as in claim 1 wherein the containers are metal containers.
3. A gas-containing means as in claim 1 wherein the gas absorbing particles are particles of hydridable metal.
4. A gas-containing means as in claim 1 wherein the containers are cylindrical.
5. A gas-containing means as in claim 4 wherein the cylindrical containers are fluted.

* * * * *